(12) United States Patent
Marubashi et al.

(10) Patent No.: US 12,329,210 B2
(45) Date of Patent: Jun. 17, 2025

(54) FLAVOR GENERATION DEVICE, PROGRAM, AND POWER SUPPLY UNIT

(71) Applicant: Japan Tobacco Inc., Tokyo (JP)

(72) Inventors: Keiji Marubashi, Tokyo (JP); Takuma Nakano, Tokyo (JP); Hajime Fujita, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 873 days.

(21) Appl. No.: 17/237,785

(22) Filed: Apr. 22, 2021

(65) Prior Publication Data

US 2021/0235769 A1 Aug. 5, 2021

Related U.S. Application Data

(63) Continuation of application No. PCT/JP2018/039930, filed on Oct. 26, 2018.

(51) Int. Cl.
*A24F 40/53* (2020.01)
*A24F 40/10* (2020.01)
(Continued)

(52) U.S. Cl.
CPC .............. *A24F 40/53* (2020.01); *A24F 40/10* (2020.01); *A24F 40/20* (2020.01); *A24F 40/30* (2020.01); *A24F 40/46* (2020.01); *A24F 40/57* (2020.01); *A24F 40/60* (2020.01); *A24F 40/65* (2020.01); *H02J 7/0049* (2020.01); *H02J 7/0063* (2013.01); *H02J 7/00712* (2020.01)

(58) Field of Classification Search
CPC .......... A24F 40/57; A24F 40/53; A24F 40/51; A24F 40/50
See application file for complete search history.

(56) References Cited

U.S. PATENT DOCUMENTS 9,220,304 B2 12/2015 Greim
10,561,807 B2 2/2020 Yamada et al.
(Continued)

FOREIGN PATENT DOCUMENTS

JP 2015-521847 A 8/2015
JP 2015-204833 A 11/2015
(Continued)

OTHER PUBLICATIONS

International Search Report, issued in PCT/JP2018/039930, dated Dec. 11, 2018.
(Continued)

*Primary Examiner* — Alex B Efta
(74) *Attorney, Agent, or Firm* — XSENSUS LLP (57) ABSTRACT

There is provided a flavor generation device that includes: a control unit configured to acquire a remaining amount value that is a value concerning a remaining amount of power stored in a power supply; a generation unit configured to atomize an aerosol source or heat a flavor source; and an auxiliary device different from the generation unit. The generation unit and the auxiliary device are electrically connected to the power supply. The control unit is configured to suppress power supply to at least one of the generation unit and the auxiliary device when the remaining amount value is higher than a discharge end value representing a discharge end state of the power supply.

18 Claims, 6 Drawing Sheets

(51) Int. Cl.
   *A24F 40/20* (2020.01)
   *A24F 40/30* (2020.01)
   *A24F 40/46* (2020.01)
   *A24F 40/57* (2020.01)
   *A24F 40/60* (2020.01)
   *A24F 40/65* (2020.01)
   *H02J 7/00* (2006.01)

(56) References Cited

U.S. PATENT DOCUMENTS

| | | | |
|---|---|---|---|
| 10,994,386 B2 | 5/2021 | Kato et al. | |
| 2014/0000638 A1 | 1/2014 | Sebastian et al. | |
| 2014/0299137 A1* | 10/2014 | Kieckbusch | A24F 40/51 131/328 |
| 2016/0213066 A1* | 7/2016 | Zitzke | H05B 1/0297 |
| 2017/0027234 A1 | 2/2017 | Farine et al. | |
| 2017/0347704 A1 | 12/2017 | Oishi | |
| 2018/0177232 A1 | 6/2018 | Ding | |
| 2019/0183183 A1 | 6/2019 | Ito | |
| 2021/0235769 A1 | 8/2021 | Marubashi et al. | |

FOREIGN PATENT DOCUMENTS

| | | |
|---|---|---|
| JP | 2017-514463 A | 6/2017 |
| WO | WO 2015/059873 A1 | 4/2015 |
| WO | WO 2016/135959 A1 | 9/2016 |
| WO | WO 2018/037582 A1 | 3/2018 |
| WO | WO 2018/107494 A1 | 6/2018 |
| WO | WO 2018/138749 A1 | 8/2018 |
| WO | WO 2018/138949 A1 | 8/2018 |
| WO | WO 2020/084779 A1 | 4/2020 |

OTHER PUBLICATIONS

Japanese Office Action for Japanese Application No. 2021-132013, dated Aug. 30, 2021, with machine translation.
Extended European Search Report for European Application No. 18937861.5, dated May 30, 2022.

* cited by examiner

FLAVOR GENERATION DEVICE, PROGRAM, AND POWER SUPPLY UNIT

CROSS REFERENCES TO RELATED APPLICATIONS

This application is a Continuation of PCT International Application No. PCT/JP2018/039930, filed on Oct. 26, 2018, which is hereby expressly incorporated by reference into the present application.

BACKGROUND OF THE INVENTION

Field of the Invention

The present invention relates to a flavor generation device, a program, and a power supply unit.

Description of the Related Art

There is conventionally known a flavor generation device including a heating element and a power supply that supplies power to the heating element. The flavor generation device is configured not to supply power to the heating element in a state in which a remaining amount of power stored in the power supply is smaller than a predetermined remaining amount (for example, PTL 1).

CITATION LIST

Patent Literature

PTL 1: Japanese Patent Laid-Open No. 2015-204833

SUMMARY OF THE INVENTION

According to the first feature, there is provided a flavor generation device comprising a control unit configured to acquire a remaining amount value that is a value concerning a remaining amount of power stored in a power supply, a generation unit configured to atomize an aerosol source or heat a flavor source, and an auxiliary device different from the generation unit, wherein the generation unit and the auxiliary device are electrically connected to the power supply, and the control unit is configured to suppress power supply to at least one of the generation unit and the auxiliary device when the remaining amount value is higher than a discharge end value representing a discharge end state of the power supply.

According to the second feature, in the first feature, the control unit is configured to suppress power supply to at least one of the generation unit and the auxiliary device when the remaining amount value is higher than the discharge end value, and the remaining amount value is lower than a lower limit threshold smaller than a charge end value representing a full charge state of the power supply, and permit power supply to at least one of the generation unit and the auxiliary device when the remaining amount value is higher than the lower limit threshold, and the remaining amount value is smaller than the charge end value.

According to the third feature, in the first feature or the second feature, the control unit is configured to suppress power supply to the auxiliary device when the remaining amount value is higher than the discharge end value.

According to the fourth feature, in any one of the first to third features, the generation unit includes a heating unit configured to heat the flavor source, the control unit is configured to suppress power supply to the heating unit when the remaining amount value is higher than the discharge end value, and the remaining amount value is not higher than a first lower limit threshold, and the first lower limit threshold is a value defined such that a flavor cannot be delivered from the flavor source into a mouth of a user by power supply to the heating unit.

According to the fifth feature, in the fourth feature, the generation unit includes an atomization unit configured to atomize the aerosol source, in addition to the heating unit, the control unit permits power supply to both the heating unit and the atomization unit when the remaining amount value is higher than the discharge end value, and the remaining amount value is higher than the first lower limit threshold, and the control unit is configured to suppress power supply to the heating unit and permit power supply to the atomization unit when the remaining amount value is higher than the discharge end value, and the remaining amount value is not higher than the first lower limit threshold.

According to the sixth feature, in any one of the first to third features, the generation unit includes an atomization unit configured to atomize the aerosol source, in addition to the heating unit, and the control unit is configured to permit power supply to the heating unit and the atomization unit when the remaining amount value is higher than the discharge end value, and the remaining amount value is higher than a first lower limit threshold, and permit power supply to a selected one of the heating unit and the atomization unit when the remaining amount value is higher than the discharge end value, and the remaining amount value is not higher than the first lower limit threshold.

According to the seventh feature, in any one of the first to third features, the generation unit is configured to heat an aerosol generating article including the flavor source and the aerosol source, the control unit is configured to suppress power supply to the generation unit when the remaining amount value is higher than the discharge end value, and the remaining amount value is not higher than a second lower limit threshold, and the second lower limit threshold is a value defined such that an aerosol of not less than a predetermined amount cannot be generated from the aerosol generating article by power supply to the generation unit, or a flavor cannot be delivered from the aerosol generating article into a mouth of a user by power supply to the generation unit.

According to the eighth feature, in any one of the first to third features, the generation unit includes an atomization unit configured to atomize the aerosol source, the control unit is configured to suppress power supply to the atomization unit when the remaining amount value is higher than the discharge end value, and the remaining amount value is not higher than a third lower limit threshold, and the third lower limit threshold is a value defined such that an aerosol of not less than a predetermined amount cannot be generated from the aerosol source by power supply to the atomization unit.

According to the ninth feature, in any one of the first to eighth features, the remaining amount value indicates a charge state of the power supply.

According to the 10th feature, in the ninth feature, the charge state of the power supply is calculated based on a relationship between the charge state of the power supply and an open circuit voltage of the power supply, or calculated based on an integrated value of a current charged in and discharged from the power supply.

According to the 11th feature, in the 10th feature, the control unit is configured to acquire a correction factor including at least one of an internal resistance value of the power supply, a degradation state of the power supply, and a temperature of the power supply, and the control unit corrects the charge state of the power supply based on the correction factor.

According to the 12th feature, in any one of the second feature and the third to 11th features depending on the second feature, the auxiliary device includes a first auxiliary device configured to make a notification concerning the remaining amount value, and a second auxiliary device different from the first auxiliary device, and when the remaining amount value is lower than the lower limit threshold, the control unit permits power supply to the first auxiliary device and the second auxiliary device while suppressing power supply to the generation unit.

According to the 13th feature, in the 12th feature, the second auxiliary device includes at least one of a notification unit, a memory, a detection unit, and a communication unit.

According to the 14th feature, in the 13th feature, the second auxiliary device includes at least two second auxiliary devices, and the control unit is configured to, for the at least two second auxiliary devices, increase the number of target auxiliary devices for which power supply should be suppressed as the remaining amount value decreases.

According to the 15th feature, in the 14th feature, the at least two second auxiliary devices include the communication unit and an auxiliary device other than the communication unit, and at a point of time of suppressing power supply to the communication unit, the control unit permits power supply to the auxiliary device other than the communication unit.

According to the 16th feature, in any one of the first to 15th features, the auxiliary device includes a third auxiliary device used to suppress degradation caused by discharge of the power supply, when the remaining amount value is higher than the discharge end value, and the remaining amount value is larger than a lower limit threshold smaller than a charge end value representing a full charge state of the power supply, the control unit permits power supply to the generation unit, and when the remaining amount value is higher than a predetermined threshold higher than the lower limit threshold, the control unit permits power supply to the third auxiliary device.

According to the 17th feature, in the 16th feature, the third auxiliary device includes at least one of a temperature adjusting unit configured to adjust a temperature of the power supply and an auxiliary power supply having an output density higher than the power supply.

According to the 18th feature, in any one of the first to 17th features, the auxiliary device includes a high remaining amount auxiliary device and a low remaining amount auxiliary device, when the remaining amount value is higher than the discharge end value, and the remaining amount value is larger than the lower limit threshold smaller than a charge end value representing the full charge state of the power supply, the control unit permits power supply to the generation unit, only when the remaining amount value is higher than a predetermined threshold higher than the lower limit threshold, the control unit permits power supply to the high remaining amount auxiliary device, and when the remaining amount value is lower than the lower limit threshold, the control unit permits power supply to the low remaining amount auxiliary device.

According to an embodiment, there may be provided a power supply control method comprising a step of acquiring a remaining amount value that is a value concerning a remaining amount of power stored in a power supply, a step of performing, by a generation unit electrically connected to the power supply, one of atomization of an aerosol source and heating of a flavor source, a step of performing, by an auxiliary device electrically connected to the power supply, processing other than the atomization of the aerosol source and the heating of the flavor source, and a step of suppressing power supply to at least one of the generation unit and the auxiliary device when the remaining amount value is higher than a discharge end value representing a discharge end state of the power supply.

According to the 19th feature, there is provided a program configured to cause a computer to execute the steps according to the 19th feature.

According to the 20th feature, there is provided a power supply unit of a flavor generation device that is electrically connectable to a unit including a generation unit configured to atomize an aerosol source or heat a flavor source, comprising a control unit configured to acquire a remaining amount value that is a value concerning a remaining amount of power stored in a power supply, wherein the control unit is configured to suppress power supply to at least one of the generation unit and an auxiliary device different from the generation unit when the remaining amount value is higher than a discharge end value representing a discharge end state of the power supply.

DESCRIPTION OF THE EMBODIMENTS

An embodiment will be described below. Note that in the following description of drawings, the same or similar reference numerals denote the same or similar parts. It should be noted that the drawings are merely schematic, and the ratios of dimensions and the like may be different from the actuality.

Hence, detailed dimensions and the like should be judged in consideration of the following explanation. In addition, the drawings may include portions whose dimensional relationships or ratios are different, as a matter of course.

Outline of Disclosure

Recently, examinations have been done to implement various functions in flavor generation devices in addition to a simple function of generating an aerosol or flavor. In such a case, power of a power supply is necessary to run various functions. The present inventors found as a result of examinations that various disadvantages occur if all functions are stopped uniformly in a case where a remaining amount of power stored in the power supply is smaller than a predetermined remaining amount.

A flavor generation device according to the outline of discloses includes a control unit configured to acquire a remaining amount value that is a value concerning a remaining amount of power stored in a power supply, a generation unit configured to atomize an aerosol source or heat a flavor source, and an auxiliary device different from the generation unit. The generation unit and the auxiliary device are electrically connected to the power supply. The control unit is configured to suppress power supply to at least one of the generation unit and the auxiliary device when the remaining amount value is higher than a discharge end value representing a discharge end state of the power supply.

According to the outline of disclosure, when the remaining amount value is higher than the discharge end value, the flavor generation device suppresses power supply to at least one of the generation unit and the auxiliary device. According to this arrangement, all functions are not stopped uniformly. That is, in a case where power supply to the generation unit is suppressed, it is possible to ensure the remaining amount of the power supply to be used by the auxiliary device that should operate even after the stop of the operation of the generation unit. In a case where power supply to the auxiliary device is suppressed, the remaining amount of the power supply to be used by the generation unit is preferentially secured, thereby prolonging the operation time of the generation unit or increasing the amount of flavor generated by the generation unit.

Example of Arrangement of Flavor Generation Device

Figure 1:
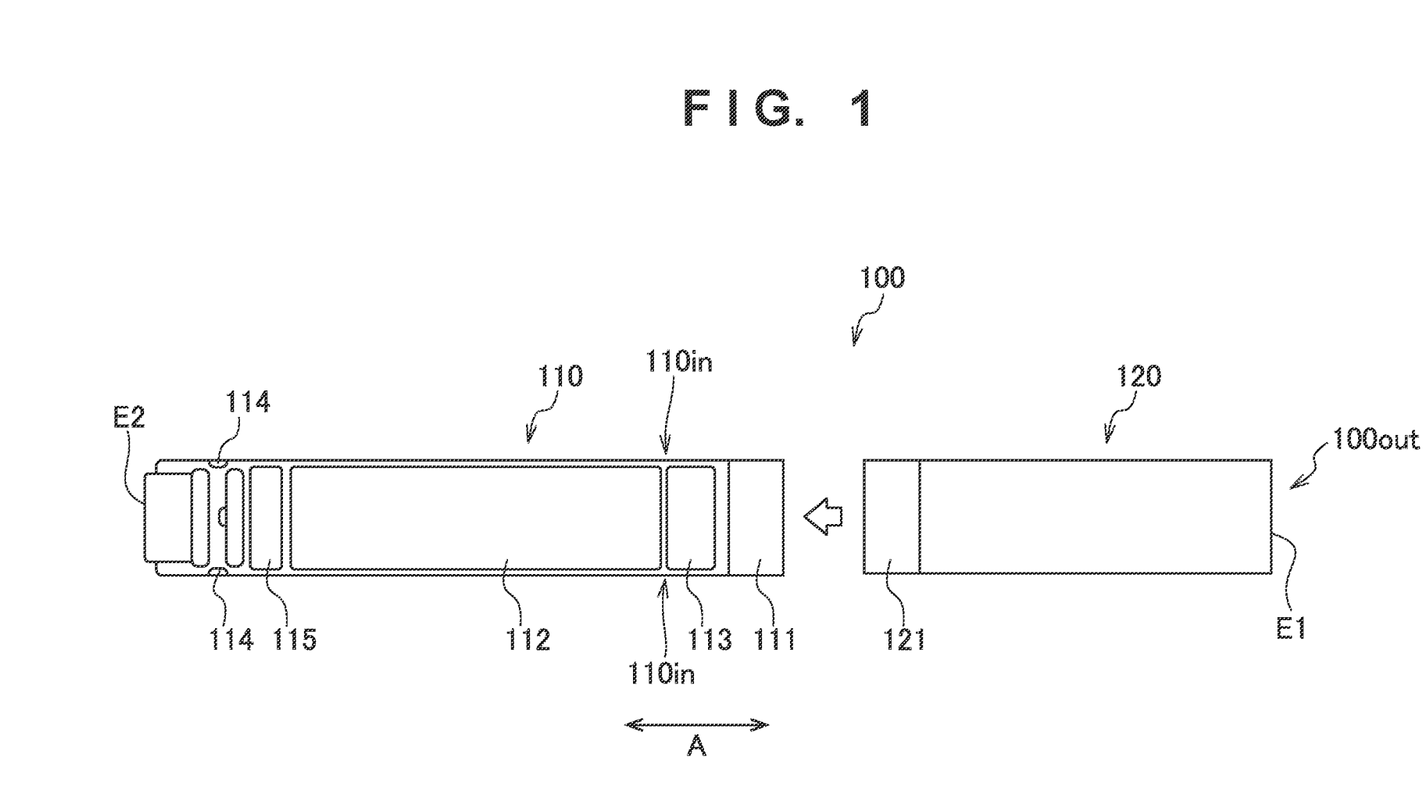
FIG. 1 is an exploded view showing an example of the arrangement of a flavor generation device according to an embodiment.
Figure 2:
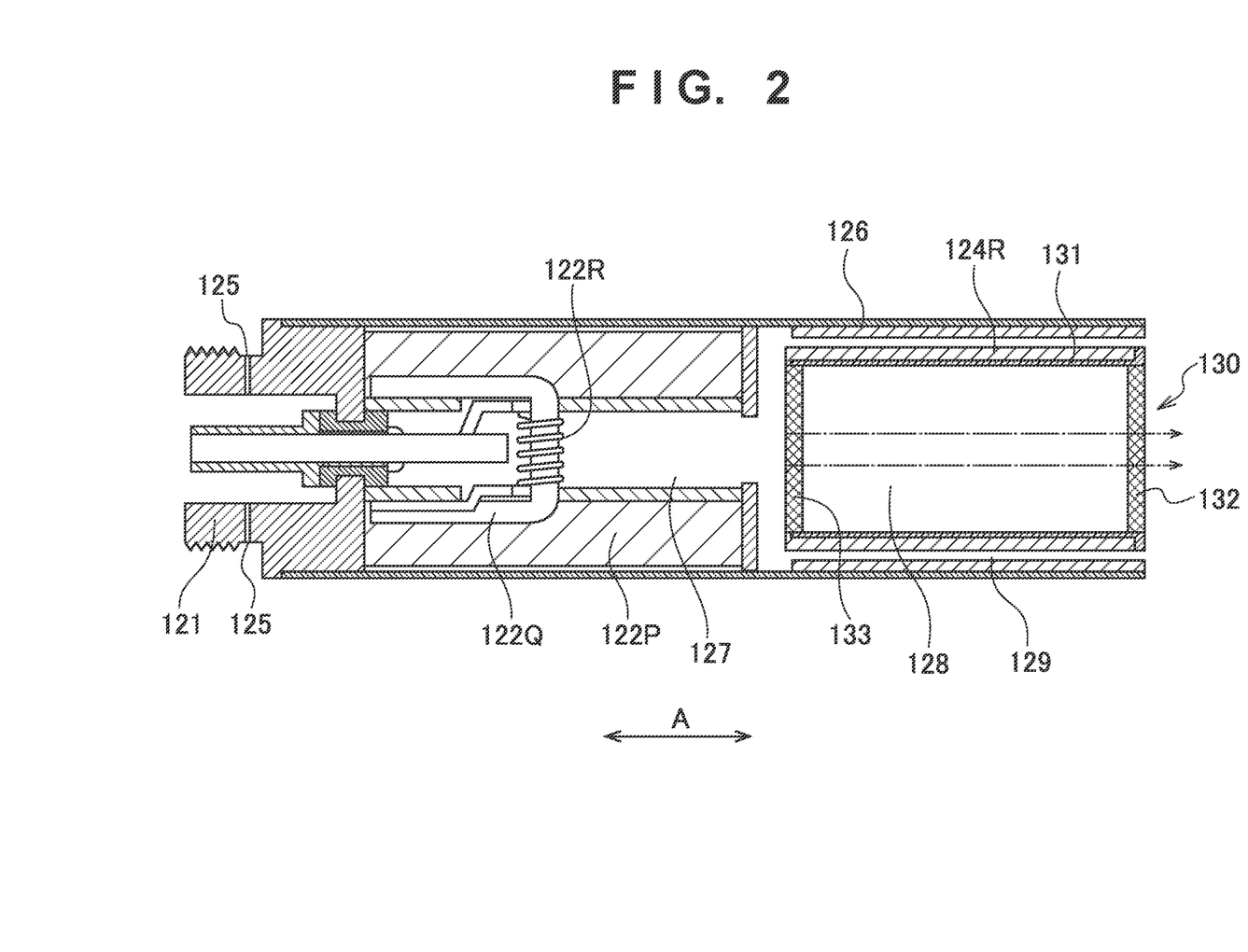
FIG. 2 is a schematic view of an atomization unit according to an embodiment.

An example of the arrangement of a flavor generation device according to an embodiment will be described below. FIG. 1 is an exploded view showing an example of the arrangement of the flavor generation device according to the embodiment. FIG. 2 is a schematic view of an atomization unit according to the embodiment.

A flavor generation device 100 may be a non-combustion type flavor generation device used to inhale a flavor without combustion. The flavor generation device 100 may preferably be a portable flavor generation device. The flavor generation device 100 includes an air channel communicating from an inlet 100in to an outlet 100out. The flavor generation device 100 may have a shape extending along a predetermined direction A that is the direction from a non-mouthpiece end E2 to a mouthpiece end E1. In this case, the flavor generation device 100 may include one end portion E1 with the mouthpiece 100out used to inhale a flavor, and the other end portion E2 on the opposite side of a mouthpiece 100out. The flavor generation device 100 includes a power supply unit 110 and an atomization unit 120.

The power supply unit 110 includes a connecting portion 111 electrically and mechanically connected to the atomization unit 120. The power supply unit 110 includes the inlet 100in. Note that the inlet 100in need not always be provided in the power supply unit 110, and may be provided in at least one of the power supply unit 110 and the atomization unit 120.

The power supply unit 110 may include a power supply 112, an inhalation sensor 113, a light emitting element 114, and a control unit 115.

The power supply 112 stores power to be supplied to each component of the flavor generation device 100. For example, the power supply 112 may be a secondary battery such as a lithium ion battery. The inhalation sensor 113 detects a puffing operation of the user. The light emitting element 114 may be an element that emits light in accordance with the state of the flavor generation device 100. For example, the light emitting element 114 may be an LED. The control unit 115 controls each component of the flavor generation device 100. For example, the control unit 115 may be an MCU (Micro Control Unit).

The atomization unit 120 includes a connecting portion 121 electrically and mechanically connected to the power supply unit 110. When the atomization unit 120 and the power supply unit 110 are mechanically connected to each other, an atomization unit 122R and a heating unit 124R (both will be described later) are electrically connected to the power supply 112. The atomization unit 120 includes the outlet 100out.

An example of the atomization unit 120 will be described below with reference to FIG. 2. The atomization unit 120 may include a reservoir 122P, a wick 122Q, and the atomization unit 122R.

The reservoir 122P may be configured to store a liquid aerosol source. For example, the reservoir 122P may be a porous body formed by a material such as a resin web. The wick 122Q may be a liquid holding member that transports the aerosol source from the reservoir 122P to near the atomization unit 122R using a capillary phenomenon. For example, the wick 122Q can be formed by glass fiber, porous ceramic, or the like. The atomization unit 122R heats the aerosol source held by the wick 122Q. For example, the atomization unit 122R is formed by a resistance heating element (for example, a heating wire) wound around the wick 122Q.

The atomization unit 120 may include an inlet 125. Air that flows from the inlet 125 passes near the atomization unit 122R. An aerosol generated by the atomization unit 122R is guided to the outlet 100out together with the air. Note that if the power supply unit 110 includes the inlet 100in, air that flows from the inlet 100in also passes near the atomization unit 122R in a similar way. The inlet 125 may communicate with the inlet 100in.

The aerosol source may be a liquid at room temperature. For example, a polyhydric alcohol such as glycerin or propylene glycol can be used as the aerosol source. The aerosol source may be formed by a plurality of substances. As an example, the aerosol source may be formed by a solvent mixture of glycerin, propylene glycol, and water. The aerosol source may contain a tobacco raw material that discharges a tobacco flavor component when heated, or an extract derived from a tobacco raw material. An aerosol source that is a liquid at room temperature has been exemplified here. Alternatively, the aerosol source may be solid at room temperature.

The atomization unit 120 may include a flavor unit 130 configured to be exchangeable. In this case, the atomization unit 120 includes the heating unit 124R that heats a flavor source stored in the flavor unit 130. The heating unit 124R may be arranged on the outer periphery of the flavor unit 130 (for example, a tubular body 131). For example, the heating unit 124R is configured by a resistance heating element (for example, a heating wire). As another example, the heating unit 124R may be arranged inside the flavor unit 130. As still another example, the heating unit 124R may be arranged on the outer periphery and inside the flavor unit 130.

The flavor unit 130 includes the tubular body 131 having a tubular shape, a ventilation member 132, and a ventilation member 133. The ventilation member 132 and the ventilation member 133 may each be a mesh body or a filter. The flavor source is stored in a space defined by the tubular body 131, the ventilation member 132, and the ventilation member 133.

The flavor source may be a solid at room temperature. As an example, the flavor source is formed by a raw material piece of a plant material that adds a tobacco flavor component to an aerosol. As the raw material piece that forms the flavor source, a formed body obtained by forming a tobacco material such as cut tobacco or a tobacco raw material into a granular shape can be used. Alternatively, the flavor source may be a formed body obtained by forming a tobacco material into a sheet shape. The raw material piece that forms the flavor source may be formed by a plant (for example, mint, herb, or the like) other than tobacco. A fragrance such as menthol may be added to the flavor source.

The flavor source may be stored to be movable in the space defined by the tubular body 131, the ventilation member 132, and the ventilation member 133. In this case, the flavor source flows in the flavor unit 130. Hence, since the flavor source in contact with the heating unit 124R localizes little, the flavor component can stably be discharged. Also, in this case, since the flavor source flows in the flavor unit 130, ventilation in the flavor unit 130 improves, and the flavor component can stably be discharged. Alternatively, the flavor source may substantially be fixed in the space defined by the tubular body 131, the ventilation member 132, and the ventilation member 133. In this case, it is possible to efficiently transmit heat from the heating unit 124R to the flavor source.

Here, the atomization unit 120 includes a channel 127 that guides an aerosol generated in the atomization unit 122R to the flavor unit 130, and a channel 128 formed in the flavor unit 130. According to this arrangement, when the aerosol passes through the flavor source, the aerosol to which a flavor is added is guided to the outlet 100out.

In the embodiment, the atomization unit 120 may include a heat insulating material 126 provided on the outer side of the heating unit 124R. According to this arrangement, a loss of heat transmission from the heating unit 124R to the flavor source can be suppressed, and an increase in the temperature of the outer surface of the atomization unit 120 caused by the heat generated by the heating unit 124R can be suppressed.

The flavor generation device 100 may include a mouthpiece with an inhalation port used by the user to inhale an inhalation component. The mouthpiece may be configured to be detachable from the atomization unit 120 or the flavor unit 130, or may be configured to be inseparably integrated. The flavor unit 130 may be configured to be exposed at the time of connecting the atomization unit 120, thereby causing the flavor unit 130 to play a role of a mouthpiece. According to this arrangement, once the stored flavor source has discharged sufficient flavor, the flavor unit 130 is exchanged with a new unit. It is therefore possible to keep the flavor generation device 100 sanitary.

In addition to the channel 128 that guides the aerosol to the outlet 100out through the flavor source, the atomization unit 120 may include a channel 129 that guides the aerosol to the outlet 100out without passing it through the flavor source. The atomization unit 120 may include a flow rate adjusting means for adjusting the ratio of the aerosol passing through the channel 128 to the aerosol passing through the channel 129.

(Functional Blocks of Flavor Generation Device)

Figure 3:
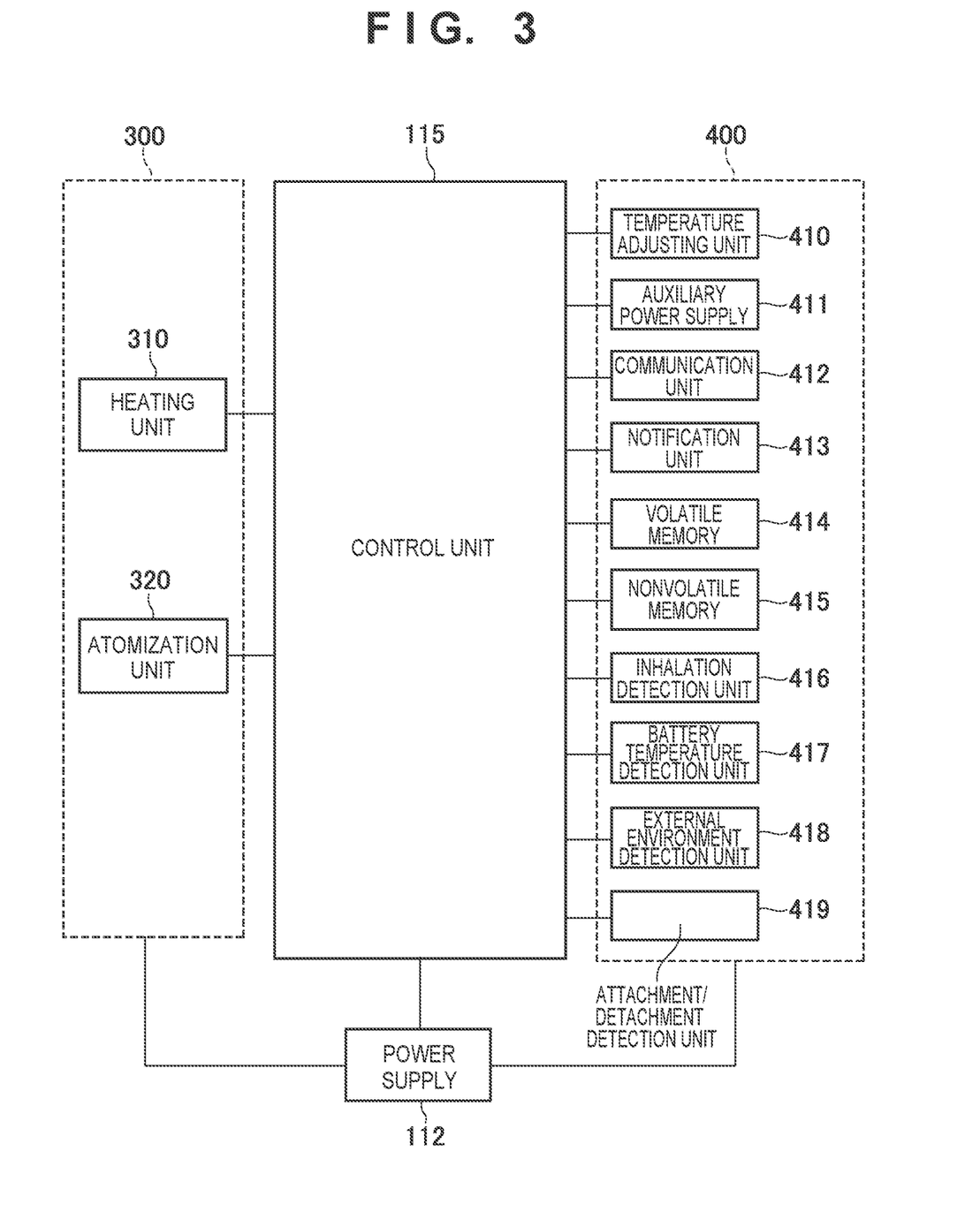
FIG. 3 is a view showing the functional blocks of a flavor generation device according to an embodiment.

The functional blocks of the flavor generation device according to the embodiment will be described below. FIG. 3 is a view showing the functional blocks of the flavor generation device according to the embodiment.

As shown in FIG. 3, the control unit 115 controls generation units 300 and auxiliary devices 400. The control unit 115, the generation units 300, and the auxiliary devices 400 are operated by power supplied from the power supply 112.

The generation units 300 include a heating unit 310 that heats the flavor source, and an atomization unit 320 that atomizes the aerosol source. The above-described heating unit 124R is an example of the heating unit 310, and the above-described atomization unit 122R is an example of the atomization unit 320. In the embodiment, however, the arrangements of the heating unit 310 and the atomization unit 320 are not particularly limited.

The auxiliary devices 400 include a temperature adjusting unit 410, an auxiliary power supply 411, a communication unit 412, a notification unit 413, a volatile memory 414, a nonvolatile memory 415, an inhalation detection unit 416, a battery temperature detection unit 417, an external environment detection unit 418, and an attachment/detachment detection unit 419. The auxiliary devices 400 need not always include all the auxiliary devices. The auxiliary device 400 may include elements other than these.

The temperature adjusting unit 410 adjusts the temperature of the power supply 112. The temperature adjusting unit 410 may be a heater that heats the power supply 112, or may be a cooler that cools the power supply 112. The temperature adjusting unit 410 may have the functions of both a heater and a cooler. The temperature adjusting unit 410 is an example of a third auxiliary device used to suppress degradation caused by discharge of the power supply. The temperature adjusting unit 410 is an example of a high remaining amount auxiliary device to be described later.

The auxiliary power supply 411 is a power supply having an output density higher than the power supply. The output density may be $W/m^3$ that is an output per unit volume, or may be W/kg that is an output per unit weight. For example, power stored in the auxiliary power supply 411 is used by the temperature adjusting unit 410. The auxiliary power supply 411 is an example of the third auxiliary device used to suppress degradation caused by discharge of the power supply. The auxiliary power supply 411 is an example of the high remaining amount auxiliary device to be described later.

The communication unit 412 communicates with an external device (for example, a smartphone, a tablet, a personal computer, or the like) other than the flavor generation device 100. The communication unit 412 may communicate with a flavor generation device or a nebulizer different from the flavor generation device 100. The communication unit 412 may be a wireless module that performs wireless communication, or may be a wired module that performs wired communication. For example, wireless communication may be communication complying with a communication scheme such as Bluetooth® or IrDA. Wired communication may be implemented by a USB cable. The communication unit 412 is an example of a second auxiliary device different from a first auxiliary device. The communication unit 412 is an example of a low remaining amount auxiliary device to be described later.

The notification unit 413 performs notification about a state of the flavor generation device 100. The notification unit 413 may be a light emitting element such as an LED, may be a display unit such as a display, or may be a vibration mechanism such as a vibrator. The state of the flavor generation device 100 may be the remaining amount of the aerosol source held by the atomization unit 120, or may be the remaining amount of the flavor source held by the flavor unit. The remaining amount may be represented by the remaining number of puffs, may be represented by the remaining energization time, or may be represented by the remaining amount of the aerosol source or the flavor source itself. Alternatively, the state of the flavor generation device 100 may be the remaining amount value of the power supply 112. The notification of the remaining amount value of the power supply 112 may be a charge alert for promoting charge of the power supply 112 if the remaining amount value of the power supply 112 is equal to or lower than the discharge end value. The above-described light emitting element 114 is an example of the notification unit 413. When making a notification concerning the remaining amount value, the notification unit 413 may be an example of the first auxiliary device that makes a notification concerning the remaining amount value. When making a notification other than the notification concerning the remaining amount value, the notification unit 413 may be an example of the second auxiliary device different from the first auxiliary device. That is, the terms "first auxiliary device" and "second auxiliary device" may selectively be used depending on a function to be executed by the notification unit 413. The notification unit 413 is an example of the low remaining amount auxiliary device to be described later.

The volatile memory 414 is a memory that is unable to retain information without power supplied from the power supply 112, like a DRAM or an SRAM. The volatile memory 414 is an example of the second auxiliary device different from the first auxiliary device. The volatile memory 414 is an example of the low remaining amount auxiliary device to be described later.

The nonvolatile memory 415 is a memory that is able to retain information without power supplied from the power supply 112, like a flash memory. The nonvolatile memory 415 is an example of the second auxiliary device different from the first auxiliary device. The nonvolatile memory 415 is an example of the low remaining amount auxiliary device to be described later.

Note that the volatile memory 414 and the nonvolatile memory 415 are sometimes collectively called a memory hereinafter.

The inhalation detection unit 416 is a detection unit that detects a puffing operation of the user. The above-described inhalation sensor 113 is an example of the inhalation detection unit 416. The inhalation detection unit 416 is an example of the second auxiliary device different from the first auxiliary device. The inhalation detection unit 416 is an example of the low remaining amount auxiliary device.

The battery temperature detection unit 417 is a detection unit that is provided near the power supply 112 and detects the temperature of the power supply 112. For example, the battery temperature detection unit 417 may be a temperature sensor. For example, the battery temperature detection unit 417 may be a thermistor or a thermopile. Detection information from the battery temperature detection unit 417 may be used for charge/discharge control of the power supply 112. For example, the charge/discharge control may be control for suppressing charge/discharge when the temperature is lower than a threshold, or may be control for suppressing charge/discharge when the temperature is higher than a threshold. Detection information from the battery temperature detection unit 417 may be used to control the above-described temperature adjusting unit 410. The battery temperature detection unit 417 is an example of the second auxiliary device different from the first auxiliary device. The battery temperature detection unit 417 is an example of the low remaining amount auxiliary device to be described later.

The external environment detection unit 418 is a detection unit that detects at least one of an external temperature and humidity. The external environment detection unit 418 may be provided at a position apart from the generation unit 300 so as not to be influenced by the generation unit 300. For example, the external environment detection unit 418 may be a temperature sensor or may be a humidity sensor. Detection information from the external environment detection unit 418 may be used to correct the inhalation detection unit 416. The external environment detection unit 418 is an example of the second auxiliary device different from the first auxiliary device. The external environment detection unit 418 is an example of the low remaining amount auxiliary device to be described later.

The attachment/detachment detection unit 419 is a detection unit that detects whether the atomization unit 120 is attached. The attachment/detachment detection unit 419 may detect whether the flavor unit 130 is attached. For example, the attachment/detachment detection unit 419 may detect, based on a change in the electrical resistance, whether a unit is attached. The attachment/detachment detection unit 419 is an example of the second auxiliary device different from the first auxiliary device. The attachment/detachment detection unit 419 is an example of the low remaining amount auxiliary device to be described later.

Note that the inhalation detection unit 416, the battery temperature detection unit 417, the external environment detection unit 418, and the attachment/detachment detection unit 419 are sometimes collectively called a detection unit hereinafter.

With this background, the control unit 115 is configured to acquire a remaining amount value concerning the remaining amount of power stored in the power supply 112. When the remaining amount value is higher than the discharge end value, the control unit 115 suppresses power supply to at least one of the generation units 300 and the auxiliary devices 400. Even when the remaining amount value is higher than the discharge end value, the control unit 115 may suppress power supply to the auxiliary device 400. Hereinafter, suppression of power supply may be inhibition of power supply or may be a decrease of the supplied power amount.

Figure 4:
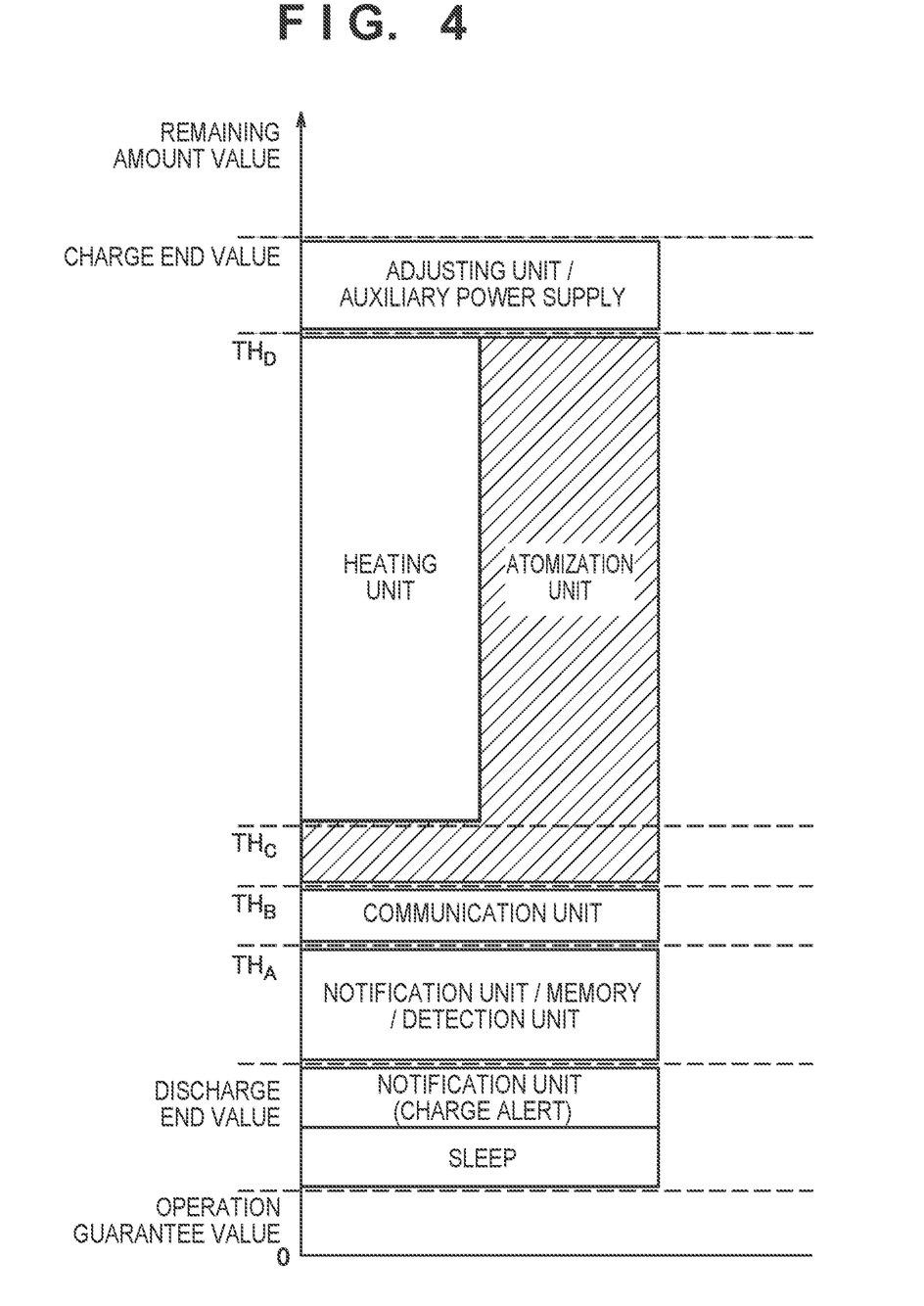
FIG. 4 is a view for explaining thresholds according to an embodiment.

Specifically, a description will be made with reference to FIG. 4. In FIG. 4, a relationship represented by charge end value>$TH_D$>$TH_C$>$TH_B$>$TH_A$>discharge end value>operation guarantee value holds. As shown in FIG. 4, as the states of the remaining amount value of the power supply 112, the charge end value, the discharge end value, and the operation guarantee value are defined based on the specifications of the power supply 112 and the specifications of the control unit 115. The charge end value is a value representing a full charge state of the power supply 112. The discharge end value is a value representing a discharge end state of the power supply 112. The operation guarantee value is a value representing a remaining amount value that should be secured to guarantee the operation of the control unit 115.

In this case, when the remaining amount value is higher than the threshold $TH_D$, the control unit 115 permits power supply to all the generation units 300 and permits power supply to all the auxiliary devices 400 (first processing). In other words, when the remaining amount value is higher than the threshold $TH_D$, there is no electric load for which power supply is suppressed by the control unit 115. When the remaining amount value is higher than the threshold $TH_D$, the remaining amount value is sufficient, and power supply to the generation units 300 or the auxiliary devices 400 need not be suppressed. As a result, it is possible to prevent the user from being given a sense of incongruity caused by unnecessary suppression of the functions of the flavor generation device 100.

The degradation of the power supply 112 progresses more readily in a case of the power supply being left standing for a long time in a state in which the remaining amount value is high than in a case of the power supply being left standing for a long time in a state in which the remaining amount value is medium. Hence, when the remaining amount value is sufficient, the control unit 115 permits power supply to all the generation units 300 and all the auxiliary devices 400, thereby making the remaining amount value close to medium. As a result, as compared to a case where the control unit 115 suppresses power supply to some of the generation units 300 and/or the auxiliary devices 400, the progress of degradation of the power supply 112 can be delayed.

When the remaining amount value is lower than the threshold $TH_D$, and the remaining amount value is higher than the threshold $TH_C$, the control unit 115 permits power supply to all the generation units 300, permits power supply to the auxiliary devices other than the third auxiliary devices (the temperature adjusting unit 410 and the auxiliary power supply 411), and suppresses power supply to the third auxiliary devices (second processing).

The temperature adjusting unit 410 and the auxiliary power supply 411 included in the third auxiliary devices, for which power supply is permitted only when the remaining amount value is higher than the threshold $TH_D$ close to the charge end value, are called high remaining amount auxiliary devices.

In the embodiment, the threshold $TH_D$ is an example of a predetermined threshold used to determine whether to permit power supply to the third auxiliary devices. If the remaining amount value is lower than the threshold $TH_D$, power supply to the third auxiliary devices is suppressed, and power supply to the generation unit 300 is permitted. Hence, the threshold $TH_D$ may be considered as an example of a lower limit threshold smaller than the charge end value.

The temperature adjusting unit 410 and the auxiliary power supply 411 belonging to the third auxiliary devices can be used for the purpose of suppressing the degradation of the power supply 112. Degradation at the time of charge/discharge in a general power supply is suppressed most when the temperature of the power supply is the room temperature. On the other hand, the lower or higher the temperature of the power supply is, the more the degradation of the power supply progresses. Hence, when the temperature of the power supply 112, which is high or low, is adjusted by the temperature adjusting unit 410 to the room temperature or a temperature close to the room temperature, the degradation of the power supply 112 can be effectively suppressed.

Additionally, in a general power supply, the larger the power or current discharged per unit time is, the more the degradation progresses. For example, in a case where power supply needs to be performed simultaneously for all elements included in the generation unit 300 and the auxiliary device unit 400, if power supply is performed only by the power supply 112, the power or current discharged per unit time by the power supply 112 becomes large. As a result, the degradation of the power supply 112 readily progresses. A similar problem can occur even in a case where the heating unit 310 or the atomization unit 320 is formed by an electric heater, and its heat capacity is large. A similar problem can occur, even in a case where the power consumption of the elements included in the auxiliary device unit 400 is large. This problem can be solved by using a plurality of power supplies. If the power or current to be discharged per unit time is large, a plurality of power supplies simultaneously perform discharge, thereby reducing the power or current discharged per power supply. Hence, when the auxiliary power supply 411 electrically connected to the generation unit 300 and the auxiliary device unit 400, like the power supply 112, is used, the degradation of the power supply 112 can be effectively suppressed.

Except for losses in power supply from the power supply 112 to the auxiliary power supply 411 at conductive wires and switches configured to electrically interconnect these, the total value of the electricity amounts of the power supply 112 and the auxiliary power supply 411 is preserved before and after the power supply. Hence, when the remaining amount value of the power supply 112 is high, actively performing power supply from the power supply 112 to the auxiliary power supply 411 can effectively suppress the degradation of the power supply 112 due to being left for a long time while preserving the electricity amount held by the flavor generation device 100.

In this way, the temperature adjusting unit 410 and the auxiliary power supply 411 belonging to the third auxiliary devices can play a role of suppressing the degradation of the power supply 112. However, power supply from the power supply 112 to the temperature adjusting unit 410 or the auxiliary power supply 411 lowers the remaining amount value of the power supply 112. For this reason, if the control unit 115 permits this regardless of the remaining amount value of the power supply 112, the operation time of the generation unit 300 would become short. Hence, the control unit 115 permits power supply from the power supply 112 to the third auxiliary devices only when the remaining amount value is higher than the threshold $TH_D$. This can effectively suppress the degradation of the power supply 112 while prolonging the operation time of the generation unit 300.

If the remaining amount value is lower than the threshold $TH_C$, and the remaining amount value is higher than the threshold $TH_B$, the control unit 115 permits power supply to the atomization unit 320 and permits power supply to the auxiliary devices other than the third auxiliary devices, and also suppresses power supply to the heating unit 310 and suppresses power supply to the third auxiliary devices (third processing).

In the embodiment, the threshold $TH_C$ is an example of a first lower limit threshold used to determine whether to permit power supply to the heating unit 310. If the remaining amount value is lower than the threshold $TH_C$, power supply to the heating unit 310 is suppressed, and power supply to the auxiliary devices other than the third auxiliary devices is permitted. Hence, the threshold $TH_C$ can also be considered as an example of a lower limit threshold smaller than the charge end value.

In another example, the threshold $TH_C$ may be a value defined such that a sufficient flavor cannot be delivered into the mouth of the user by power supply to the heating unit 310.

As described above, the flavor unit 130 may be configured such that when the aerosol generated by the atomization unit 320 passes through it, a flavor is added to the aerosol. In this embodiment, when power is supplied only to the atomization unit 320 out of the heating unit 310 and the atomization unit 320, the aerosol to which the flavor is added can be delivered into the mouth of the user. That is, the heating unit 310 is used to increase the amount of the flavor added to the aerosol. In this embodiment, the threshold $TH_C$ may be a value defined such that even if power is supplied to the heating unit 310, the flavor added to the aerosol cannot be increased, or the flavor amount can only be increased to the extent that the user cannot sense it.

In any of the embodiments, even when power is supplied only to the heating unit 310 out of the heating unit 310 and the atomization unit 320, it is difficult to deliver the aerosol with the added flavor into the mouth of the user. Hence, the threshold for suppressing power supply to the heating unit 310 is preferably equal to or higher than the threshold for suppressing power supply to the atomization unit 320. In the flavor generation device 100 capable of generating the aerosol with the added flavor without power supply to the heating unit 310, the threshold for suppressing power supply to the heating unit 310 is more preferably higher than the threshold for suppressing power supply to the atomization unit 320.

If the remaining amount value is lower than the threshold $TH_B$, and the remaining amount value is higher than the threshold $TH_A$, the control unit 115 permits power supply to the auxiliary devices other than the third auxiliary devices, and also suppresses power supply to all the generation units 300 and suppresses power supply to the third auxiliary devices (fourth processing).

In the embodiment, the threshold $TH_B$ is an example of a third lower limit threshold used to determine whether to permit power supply to the atomization unit 320. The threshold $TH_B$ is a value defined such that a predetermined amount or more or aerosol cannot be generated from the aerosol source by power supply to the atomization unit 320. For example, the predetermined amount may be a TPM (Total Particulate Matter) of about 0.2 mg/puff as the level at which an aerosol that has trapped a flavor is delivered into the mouth of the user. Alternatively, the predetermined amount may be a TPM of about 0.01 mg/puff as the level at which the user can sense the flavor.

When the remaining amount value is lower than the threshold $TH_B$, power supply to the generation unit 300 is suppressed, and power supply to auxiliary devices (the first auxiliary device and the second auxiliary devices) other than the third auxiliary devices is permitted. Hence, the threshold $TH_B$ may be considered as an example of a lower limit threshold smaller than the charge end value.

When the remaining amount value of the power supply 112 is too low to generate a predetermined amount of aerosol, even if power is supplied to the atomization unit 320, the power stored in the power supply 112 is only wasted. Hence, when the remaining amount value is lower than the threshold $TH_B$, the control unit 115 suppresses power supply from the power supply 112 to the atomization unit 320, thereby simultaneously achieving avoidance of such waste and prolongation of the operation time of a low remaining amount auxiliary device to be described later.

When the remaining amount value is lower than the threshold $TH_A$, and the remaining amount value is higher than the discharge end value, the control unit 115 permits power supply to the auxiliary devices other than the third auxiliary devices and the communication unit 412, and also suppresses power supply to all the generation units 300 and suppresses power supply to the third auxiliary devices and the communication unit 412 (fifth processing).

In the embodiment, based on whether the remaining amount value is higher than the threshold $TH_A$, it is determined whether to suppress power supply to the communication unit 412. That is, the control unit 115 is configured to, for two or more second auxiliary devices, increase the number of target auxiliary devices for which power supply should be suppressed as the remaining amount value decreases. At the point of time of suppressing power supply to the communication unit 412, the control unit 115 permits power supply to the auxiliary devices other than the communication unit 412.

The notification unit 413, the memories, and the detection units are closely related to the states of the flavor generation device 100 and the power supply 112. On the other hand, the communication unit 412 is not so relevant. In other words, the communication unit 412 is less important than the notification unit 413, the memories, and the detection units. For this reason, as the remaining amount value decreases, the control unit 115 preferably suppresses power supply to the communication unit 412 earlier than suppressing it to the notification unit 413, the memories, and the detection units.

When the remaining amount value is lower than the discharge end value, and the remaining amount value is higher than the operation guarantee value, the control unit 115 suppresses power supply to all the generation units 300 and suppresses power supply to all the auxiliary devices 400. However, power supply to the above-described charge alert function is permitted (sixth processing). Here, the control unit 115 may transition to a sleep state for suppressing power consumption after a charge alert notification for a predetermined period.

At least some of the second auxiliary devices are called low remaining amount auxiliary devices because power supply is permitted until the remaining amount value reaches the discharge end value.

(Power Supply Control Method)

Figure 5:
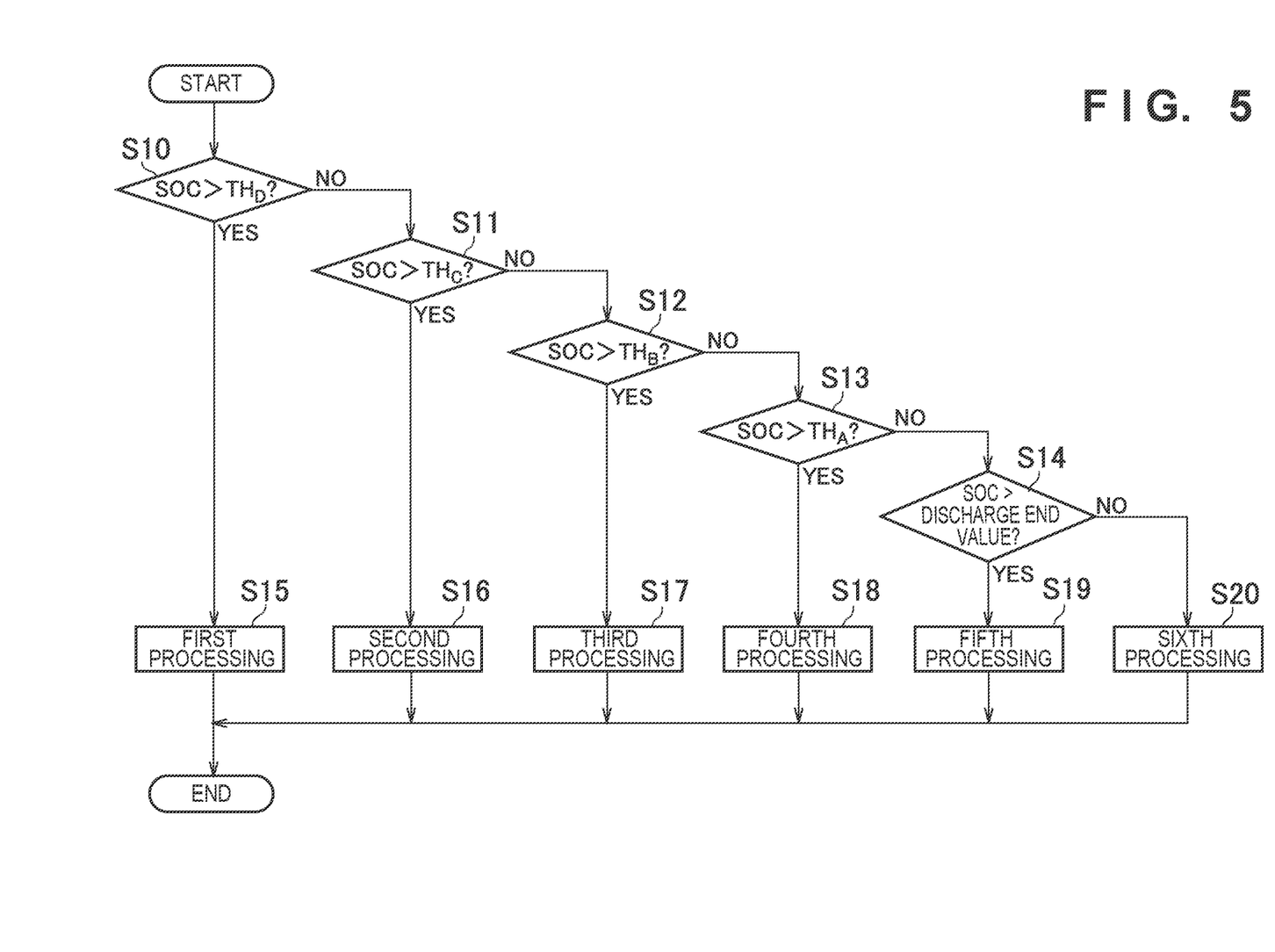
FIG. 5 is a flowchart showing a power supply control method according to an embodiment.

A power supply control method according to the embodiment will be described below. FIG. 5 is a flowchart showing a power supply control method according to the embodiment. The procedure shown in FIG. 5 is a procedure executed by the flavor generation device 100 (control unit 115).

As shown in FIG. 5, in step S10, the flavor generation device 100 determines whether the remaining amount value is higher than the threshold $TH_D$. If the determination result is YES, the process of step S15 is performed. If the determination result is NO, the process of step S11 is performed.

In step S11, the flavor generation device 100 determines whether the remaining amount value is higher than the threshold $TH_C$. If the determination result is YES, the process of step S16 is performed. If the determination result is NO, the process of step S12 is performed.

In step S12, the flavor generation device 100 determines whether the remaining amount value is higher than the threshold $TH_B$. If the determination result is YES, the process of step S17 is performed. If the determination result is NO, the process of step S13 is performed.

In step S13, the flavor generation device 100 determines whether the remaining amount value is higher than the threshold $TH_A$. If the determination result is YES, the process of step S18 is performed. If the determination result is NO, the process of step S14 is performed.

In step S14, the flavor generation device 100 determines whether the remaining amount value is higher than the discharge end value. If the determination result is YES, the process of step S19 is performed. If the determination result is NO, the process of step S20 is performed.

In step S15, the flavor generation device 100 performs the above-described first processing.

In step S16, the flavor generation device 100 performs the above-described second processing.

In step S17, the flavor generation device 100 performs the above-described third processing.

In step S18, the flavor generation device 100 performs the above-described fourth processing.

In step S19, the flavor generation device 100 performs the above-described fifth processing.

In step S20, the flavor generation device 100 performs the above-described sixth processing.

Functions and Effects

In the embodiment, when the remaining amount value is higher than the discharge end value, the flavor generation device 100 suppresses power supply to at least one of a generation unit 300 and an auxiliary device 400. According to this arrangement, all functions are not stopped uniformly. That is, in a case where power supply to the generation unit 300 is suppressed, it is possible to ensure the remaining amount of the power supply to be used by the auxiliary device 400 that should operate even after the stop of the operation of the generation unit 300. In a case where power supply to the auxiliary device 400 is suppressed, the remaining amount of the power supply to be used by the generation unit 300 is preferentially ensured, thereby prolonging the operation time of the generation unit 300 or increasing the amount of flavor generated by the generation unit.

Modification Example 1

A modification example 1 of the embodiment will be described below. Points different from the embodiment will be described below.

Figure 6:
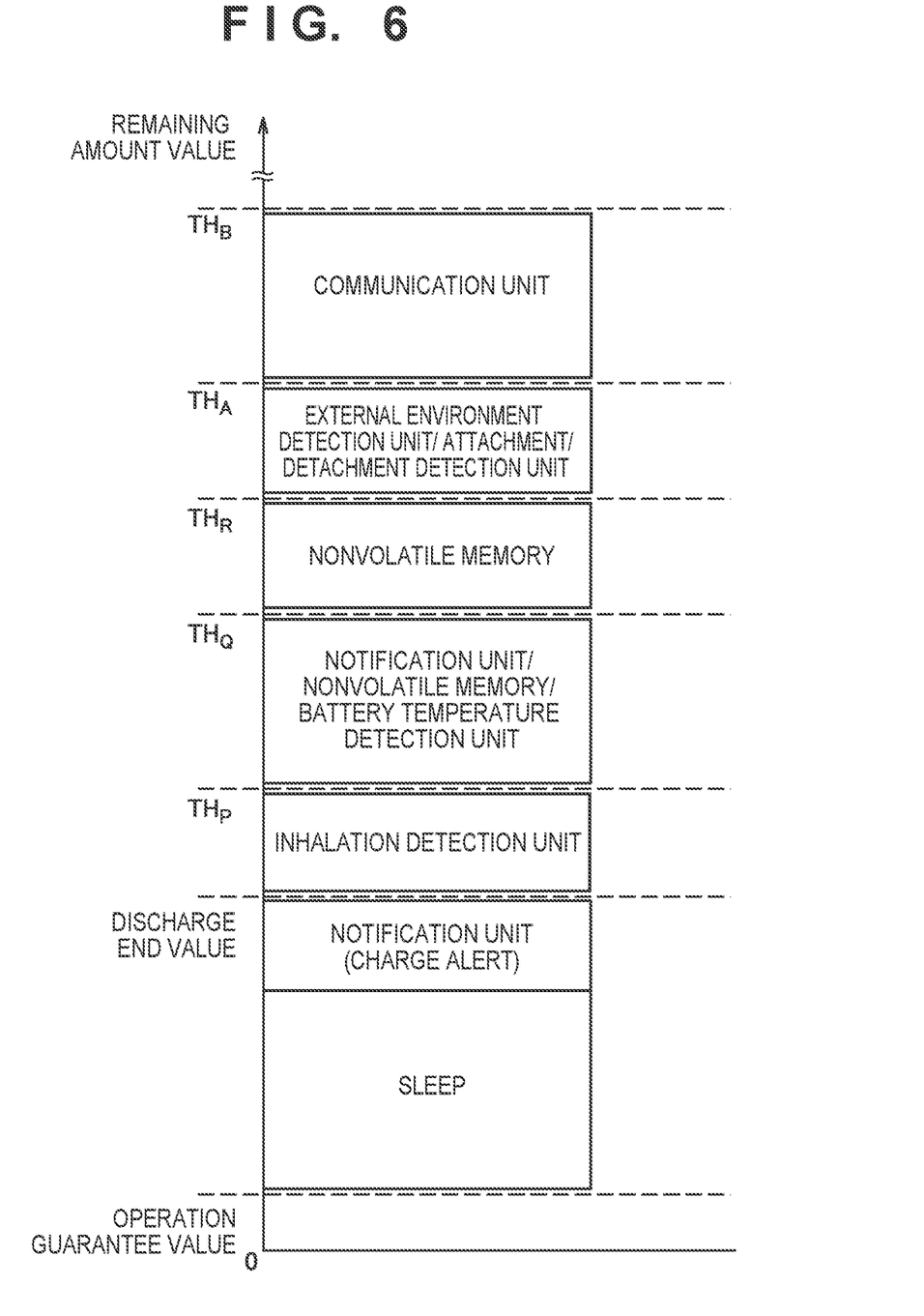
FIG. 6 is a view for explaining thresholds according to a modification example 1.

In the embodiment, priority orders are not particularly defined for the second auxiliary devices other than the communication unit 412. On the other hand, in modification example 1, priority orders are defined also for the second auxiliary devices other than the communication unit 412. In FIG. 6, the remaining amount value larger than the threshold $TH_B$ is not shown. In FIG. 6, a relationship represented by $TH_A>TH_R>TH_Q>TH_P$>discharge end value holds.

As shown in FIG. 6, when the remaining amount value is lower than the threshold $TH_R$, the control unit 115 may suppress power supply to the external environment detection unit 418 and the attachment/detachment detection unit 419. These are not associated with acquisition of information concerning the power supply 112 and write or read to/from the memories. Hence, these are less important than the auxiliary devices for which power supply is to be suppressed with a lower remaining amount value.

When the remaining amount value is lower than the threshold $TH_Q$, the control unit 115 may also stop power supply to the nonvolatile memory 415. As described above, the nonvolatile memory 415 can hold information even if power supply is suppressed. Hence, as compared to a volatile memory that cannot hold information if power supply is suppressed, the nonvolatile memory 415 has little effect on the flavor generation device 100 even if power supply is suppressed.

When the remaining amount value is lower than the threshold $TH_P$, the control unit 115 may also stop power supply to the notification unit 413 (except the charge alert), the volatile memory 414, and the battery temperature detection unit 417. When the charge alert is executed, the control unit 115 and the notification unit 413 consume the remaining amount of the power supply 112. Hence, the charge alert is preferably executed at an appropriate timing such that lowering of the remaining amount of the power supply 112 is suppressed. To suppress the lowering of the remaining amount, the charge alert may be executed at the time of inhalation being detected by the inhalation detection unit 416.

When the remaining amount value is lower than the discharge end value, the control unit 115 may further stop power supply to the inhalation detection unit 416.

According to this arrangement, since the priority orders are defined for the second auxiliary devices as well, the remaining amount of the power supply 112 to be used by the second auxiliary devices of higher priory orders can be ensured, and the operation times of the second auxiliary devices of higher priority orders can be made long.

Note that as the priority orders of the second auxiliary devices other than the communication unit 412, priority orders other than those of the above-described embodiment may be used.

As another example, when the remaining amount value is lower than the threshold $TH_P$, the control unit 115 may stop power supply to the inhalation detection unit 416. When the remaining amount value is lower than the discharge end value, the control unit 115 may stop power supply to the notification unit 413 (except the charge alert), the volatile memory 414, and the battery temperature detection unit 417. This allows the control unit 115 to detect the state of the power supply 112 until the remaining amount value of the power supply 112 reaches the discharge end value. Hence, the safety of the flavor generation device 100 improves.

As still another example, the user may be able to set the priority orders of the second auxiliary devices other than the communication unit 412 freely or based on a certain algorithm.

Modification Example 2

A modification example 2 of the embodiment will be described below. Points different from the embodiment will be described below.

An example of the remaining amount value of the power supply 112, which has not been particularly mentioned in the embodiment, will be described in modification example 2. As the remaining amount value of the power supply 112, a charge state (SOC: State Of Charge) of the power supply 112 can be used.

For example, the control unit 115 may calculate the charge state of the power supply 112 based on the relationship between the charge state of the power supply 112 and the open circuit voltage of the power supply 112. More specifically, the control unit 115 stores the relationship (an SOC-OCV curve or an SOC-OCV line) between the charge state (SOC) and the open circuit voltage (OCV) in advance, and may calculate the charge state of the power supply 112 by measuring the open circuit voltage of the power supply 112.

Alternatively, the control unit 115 may calculate the charge state of the power supply 112 based on the integrated value of a current charged in and discharged from the power supply 112. More specifically, the control unit 115 calculates an increase/decrease of the charge state in terms of the current by measuring current charged in and discharged from the power supply 112.

In these cases, the control unit 115 may be configured to acquire a correction factor including at least one of the internal resistance value of the power supply 112, the degradation state of the power supply 112, and the temperature of the power supply 112. The control unit 115 may correct the charge state of the power supply 112 based on the correction factor. For example, the internal resistance value of the power supply 112 is a factor that has an influence on the characteristic of the above-described SOC-OCV curve or SOC-OCV line. The degradation state of the power supply 112 is a factor that has an influence on the capacity of full charge. The temperature of the power supply 112 is a factor that has an influence on the characteristic of the above-described SOC-OCV curve or SOC-OCV line.

Modification Example 3

A modification example 3 of the embodiment will be described below. Points different from the embodiment will be described below.

In the embodiment, the flavor generation device 100 permits power supply to both the heating unit 310 and the atomization unit 320 when the remaining amount value is higher than the threshold $TH_C$, and suppresses power supply to the heating unit 310 and permits power supply to the atomization unit 320 when the remaining amount value is lower than the threshold $TH_C$.

In modification example 3, when the remaining amount value is higher than the threshold $TH_C$, the flavor generation device 100 permits power supply to both the heating unit 310 and the atomization unit 320, as in the embodiment. On the other hand, when the remaining amount value is lower than the threshold $TH_C$, the flavor generation device 100 permits power supply to a selected one of the heating unit 310 and the atomization unit 320. The selection may be done by the user. Alternatively, the selection may be automatically performed based on the past selection of the user or selection of another user. For example, the automatic selection may be done by an AI (Artificial Intelligence).

Modification Example 4

A modification example 4 of the embodiment will be described below. Points different from the embodiment will be described below.

In the embodiment, a case where the flavor source and the aerosol source are separate has been described. In modification example 4, a case where an aerosol generating article including a flavor source and an aerosol source is provided will be described. For example, the aerosol generating article may be a rod formed by a tobacco product. In this case, the generation unit 300 heats the aerosol generating article. Note that the generation unit 300 may only need to include either one of the heating unit 310 and the atomization unit 320.

In this case, the flavor generation device 100 (control unit 115) is configured to suppress power supply to the generation unit 300 when the remaining amount value is higher than the discharge end value, and the remaining amount value is equal to or lower than the second lower limit threshold. The second lower limit threshold is a value defined such that a predetermined amount or more of aerosol cannot be generated from the aerosol generating article by power supply to the generation unit 300, or the flavor cannot be delivered from the aerosol generating article into the mouth of the user by power supply to the generation unit 300.

That is, in the above-described embodiment, the second lower limit threshold may be considered as the threshold $TH_C$ shown in FIG. 4, or may be considered as the threshold $TH_B$ shown in FIG. 4. Note that in the modification example 4, the heating unit 310 and the atomization unit 320 are not separately provided.

Other Embodiments

The present invention has been described by the above-described embodiment. However, it should not be understood that the description and drawings constituting a part of this disclosure limit the present invention. From this disclosure, various alternative embodiments, examples, and operation techniques will be apparent to those skilled in the art.

In the embodiment, the generation units 300 include the heating unit 310 and the atomization unit 320. However, the embodiment is not limited to this. The generation unit 300 may include either one of the heating unit 310 and the atomization unit 320.

In the embodiment, a case where auxiliary devices shown in FIG. 3 are provided as the auxiliary devices 400 has been exemplified. However, the embodiment is not limited to this. Providing at least one of the auxiliary devices shown in FIG. 3 as the auxiliary device 400 suffices.

Although not particularly mentioned in the embodiment, a program configured to cause a computer to execute each processing to be performed by the flavor generation device 100 (control unit 115) may be provided. The program may be recorded in a computer-readable medium. When the computer-readable medium is used, the program can be installed in the computer. The computer-readable medium in which the program is recorded may be a non-transitory recording medium. The non-transitory recording medium is not particularly limited, and may be, for example, a recording medium such as a CD-ROM or a DVD-ROM.

Alternatively, a chip formed by a memory that stores a program configured to execute each processing to be performed by the flavor generation device 100 (control unit 115), and a processor that executes the program stored in the memory may be provided.

What is claimed is:
1. A flavor generation device comprising:
a controller configured to acquire a remaining amount value that is a value concerning a remaining amount of power stored in a power supply;
one or more of an atomizer configured to atomize an aerosol source and a heater configured to heat a flavor source; and
an auxiliary device different from the one or more of the atomizer and heater,
wherein the one or more of the atomizer or heater and the auxiliary device are electrically connected to the power supply, and
the controller is configured to suppress power supply to at least one of the atomizer or heater and the auxiliary device when the remaining amount value is higher than a discharge end value representing a discharge end state of the power supply,
wherein the auxiliary device includes a high remaining amount auxiliary device and a low remaining amount auxiliary device,
when the remaining amount value is higher than the discharge end value, and the remaining amount value is larger than the lower limit threshold smaller than a charge end value representing the full charge state of the power supply, the controller permits power supply to the one or more of the atomizer and the heater,
only when the remaining amount value is higher than a predetermined threshold higher than the lower limit threshold, the controller permits power supply to the high remaining amount auxiliary device, and
when the remaining amount value is lower than the lower limit threshold, the controller permits power supply to the low remaining amount auxiliary device.
2. The flavor generation device according to claim 1, wherein the controller is configured to suppress power supply to at least one of the atomizer, the heater and the auxiliary device when the remaining amount value is higher than the discharge end value, and the remaining amount value is lower than a lower limit threshold smaller than a charge end value representing a full charge state of the power supply, and permit power supply to at least one of the atomizer or heater and the auxiliary device when the remaining amount value is higher than the lower limit threshold, and the remaining amount value is smaller than the charge end value.

3. The flavor generation device according to claim 1, wherein the controller is configured to suppress power supply to the auxiliary device when the remaining amount value is higher than the discharge end value.

4. The flavor generation device according to claim 1, wherein in a case that the one or more of the atomizer and heater includes the heater, the controller is configured to suppress power supply to the heater when the remaining amount value is higher than the discharge end value, and the remaining amount value is not higher than a first lower limit threshold, and the first lower limit threshold is a value defined such that a flavor cannot be delivered from the flavor source into a mouth of a user by power supply to the heater.

5. The flavor generation device according to claim 4, wherein the atomizer and the heater are included in the flavor generation device, wherein the controller permits power supply to both the heater and the atomizer when the remaining amount value is higher than the discharge end value, and the remaining amount value is higher than the first lower limit threshold, and the controller is configured to suppress power supply to the heater and permit power supply to the atomizer when the remaining amount value is higher than the discharge end value, and the remaining amount value is not higher than the first lower limit threshold.

6. The flavor generation device according to claim 1, wherein the atomizer and the heater are included in the flavor generation device, and the controller is configured to
permit power supply to the heater and the atomizer when the remaining amount value is higher than the discharge end value, and the remaining amount value is higher than a first lower limit threshold, and
permit power supply to a selected one of the heater and the atomizer when the remaining amount value is higher than the discharge end value, and the remaining amount value is not higher than the first lower limit threshold.

7. The flavor generation device according to claim 1, wherein in a case that the one or more of the atomizer and heater includes the heater, the heater is configured to heat an aerosol generating article including the flavor source and the aerosol source, the controller is configured to suppress power supply to the heater when the remaining amount value is higher than the discharge end value, and the remaining amount value is not higher than a second lower limit threshold, and the second lower limit threshold is a value defined such that an aerosol of not less than a predetermined amount cannot be generated from the aerosol generating article by power supply to the heater, or a flavor cannot be delivered from the aerosol generating article into a mouth of a user by power supply to the heater.

8. The flavor generation device according to claim 1, wherein in a case that the one or more of the atomizer and heater includes the atomizer, the controller is configured to suppress power supply to the atomizer when the remaining amount value is higher than the discharge end value, and the remaining amount value is not higher than a third lower limit threshold, and the third lower limit threshold is a value defined such that an aerosol of not less than a predetermined amount cannot be generated from the aerosol source by power supply to the atomizer.

9. The flavor generation device according to claim 1, wherein the remaining amount value indicates a charge state of the power supply.

10. The flavor generation device according to claim 9, wherein the charge state of the power supply is calculated based on a relationship between the charge state of the power supply and an open circuit voltage of the power supply, or calculated based on an integrated value of a current charged in and discharged from the power supply.

11. The flavor generation device according to claim 10, wherein the controller is configured to
acquire a correction factor including at least one of an internal resistance value of the power supply, a degradation state of the power supply, and a temperature of the power supply, and
correct the charge state of the power supply based on the correction factor.

12. The flavor generation device according to claim 2, wherein the auxiliary device includes a first auxiliary device corresponding to a user interface configured to notify a user concerning the remaining amount value, and a second auxiliary device different from the first auxiliary device, and
when the remaining amount value is lower than the lower limit threshold, the controller permits power supply to the first auxiliary device and the second auxiliary device while suppressing power supply to the one or more of the heater and atomizer.

13. The flavor generation device according to claim 12, wherein the second auxiliary device includes at least one of a user interface, a memory, a sensor, and a communication unit.

14. The flavor generation device according to claim 13, wherein the second auxiliary device includes at least two second auxiliary devices, and
the controller is configured to, for the at least two second auxiliary devices, increase the number of target auxiliary devices for which power supply should be suppressed as the remaining amount value decreases.

15. The flavor generation device according to claim 14, wherein the at least two second auxiliary devices include the communication unit and an auxiliary device other than the communication unit, and
at a point of time of suppressing power supply to the communication unit, the controller permits power supply to the auxiliary device other than the communication unit.

16. The flavor generation device according to claim 1, wherein the auxiliary device includes a second auxiliary device,
when the remaining amount value is higher than the discharge end value, and the remaining amount value is larger than a lower limit threshold smaller than a charge end value representing a full charge state of the power supply, the controller permits power supply to the one or more of the atomizer and the heater, and when the remaining amount value is higher than a predetermined threshold higher than the lower limit threshold, the controller permits power supply to the third auxiliary device.

17. The flavor generation device according to claim 16, wherein the second auxiliary device includes at least one of a temperature adjusting unit configured to adjust a temperature of the power supply and an auxiliary power supply having an output density higher than the power supply.

18. A power supply unit of a flavor generation device that is electrically connectable to a unit including a generation unit configured to atomize an aerosol source or heat a flavor source, comprising     a control unit configured to acquire a remaining amount value that is a value concerning a remaining amount of power stored in a power supply,     wherein the control unit is configured to suppress power supply to at least one of the generation unit and an auxiliary device different from the generation unit when the remaining amount value is higher than a discharge end value representing a discharge end state of the power supply,     wherein the auxiliary device includes a high remaining amount auxiliary device and a low remaining amount auxiliary device,     when the remaining amount value is higher than the discharge end value, and the remaining amount value is larger than a lower limit threshold smaller than a charge end value representing a full charge state of the power supply, the controller permits power supply to the generation unit,     only when the remaining amount value is higher than a predetermined threshold higher than the lower limit threshold, the controller permits power supply to the high remaining amount auxiliary device, and     when the remaining amount value is lower than the lower limit threshold, the controller permits power supply to the low remaining amount auxiliary device.

\* \* \* \* \*